United States Patent
Le Roux et al.

(10) Patent No.: US 6,543,625 B1
(45) Date of Patent: Apr. 8, 2003

(54) CARTRIDGE FOR FILTERING A LIQUID CIRCULATING IN A HYDRAULIC ENGINE OR EQUIPMENT AND CORRESPONDING FILTERING CARTRIDGE-SEALING JOINT ASSEMBLY

(75) Inventors: Benoît Le Roux, Fouesnant (FR); Gildas Le Men, Quimper (FR); Jean-Luc Guichaoua, Combrit (FR)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 09/581,958
(22) PCT Filed: Nov. 16, 1999
(86) PCT No.: PCT/FR99/02811
§ 371 (c)(1), (2), (4) Date: Sep. 28, 2001
(87) PCT Pub. No.: WO00/29091
PCT Pub. Date: May 25, 2000

(30) Foreign Application Priority Data
Nov. 16, 1998 (FR) .............................................. 98 14514

(51) Int. Cl.$^7$ ............................................. B01D 27/00
(52) U.S. Cl. .................. 210/483; 210/497.01; 210/437; 210/450
(58) Field of Search ............................. 210/323.2, 438, 210/450, 457, 493.2, 437, 440, 483, 497.01; 55/502; 277/918

(56) References Cited

U.S. PATENT DOCUMENTS

| | | | |
|---|---|---|---|
| 5,399,264 A | * | 3/1995 | Pulek et al. ................. 210/450 |
| 5,685,985 A | * | 11/1997 | Brown et al. ............... 210/450 |
| 5,718,825 A | * | 2/1998 | Greive et al. ............... 210/298 |

FOREIGN PATENT DOCUMENTS

| | | | | |
|---|---|---|---|---|
| DE | 4325997 | * | 1/1994 | ........... B01D/27/08 |

* cited by examiner

Primary Examiner—Matthew O. Savage
(74) Attorney, Agent, or Firm—Gary M. Gron

(57) ABSTRACT

The invention relates to a filter cartridge (1) to be inserted in the filter feed trough of a filter for fluid flowing in a hydraulic motor or apparatus and for cooperating with a center tube (2) of said filter, said cartridge having a filter medium (3) and at least one end flange (4) joined to said filter medium, characterized in that said end flange (4) is extended by a projecting part (5) defining a cavity for lodging a gasket (7), and in that said gasket has at least one pressurizing duct from the inside of said cavity. The invention also relates to a corresponding filter cartridge (1)/gasket (7) assembly wherein said gasket has at least three lobes defining three fluid receiving areas.

10 Claims, 3 Drawing Sheets

CARTRIDGE FOR FILTERING A LIQUID CIRCULATING IN A HYDRAULIC ENGINE OR EQUIPMENT AND CORRESPONDING FILTERING CARTRIDGE-SEALING JOINT ASSEMBLY

This invention relates to the field of designing and constructing filter cartridges used in filters for fluids flowing in hydraulic motors or apparatuses.

In general, such filter cartridges are shaped cylindrically and are composed of a filter medium, that can be made e.g. of paper, cardboard or else felt, to which two end flanges are joined. The present trend is to make such filter cartridges from materials that can be incinerated. In particular, regarding flanges, the present trend is to make plastic flanges.

Such filter cartridges are installed inside filter feed troughs, and in many instances, so as to cooperate with a center tube thereof. This center tube can consist of one or two pieces. In order to ensure sealing during filtration, plastic sealing rings are arranged between center tube and flanges.

State-of-the-art gaskets are installed under compression in order to operate correctly. However, though such compression poses no problem for metal parts, it has turned out that it could eventually result in sealing damage when using plastic flanges.

It is the main object of this invention to provide sealing means for filter cartridges without this drawback and therefore allowing to ensure good sealing even with plastic parts.

In particular, it is an object of this invention to reveal such means that allow of an adaptation to dimensional evolution between the end flange and the center tube of the trough.

The various objects are achieved with the invention relating to a filter cartridge to be inserted in the filter feed trough of a filter for fluid flowing in a hydraulic motor or apparatus and for cooperating with a center tube of said filter, said cartridge having a filter medium and at least one end flange joined to said filter medium, characterized in that said end flange is extended by a projecting part defining a cavity for lodging a gasket and in that said gasket has at least one pressurizing duct inside said cavity.

Such a pressurizing duct inside the cavity allows to press the gasket against the center tube during filter operation and thus to provide perfect sealing, whatever the evolution of clearance between flange and tube may have been. The gasket can be installed with low initial compression (it will be noted that initial compression is independent of gasket performance) and the gasket can function at high pressures.

It will be understood that the pressurizing duct can be produced in different ways inside the end flange. According to a preferred alternative, this duct consists of a plurality of notches, advantageously distributed equally over the inside flange rim.

The cavity mentioned above for lodging the gasket can also be produced in several ways. In particular, this cavity has the advantage of making it easier to pull out the gasket together with the filter. According to a particularly interesting alternative, said projecting part includes a first round portion essentially parallel to the longitudinal axis of said cartridge extended by at least one second portion essentially perpendicular to said first portion. It will be understood that, in this embodiment, the first and second portions are formed integrally. The cavity thus defined will permit easy prepositioning of the gasket inside the trough without letting it come out easily. Such prepositioning will make the installation of the cartridge and gasket assembly easier. This cavity will also allow to pull out easily the filter/gasket assembly from the trough, without the risk of the gasket staying inside the trough.

Although the second portion of the projecting part defining the cavity can be continuous for the whole circumference of the first portion, according to a preferred alternative, this second portion will consist of a plurality of pins advantageously distributed equally over the circumference of the first round portion.

According to another alternative, the cavity can also be defined by a first round portion essentially parallel to the longitudinal cartridge axis, on the one hand, and a round member that can be joined, e.g. through welding, in particular ultrasonic welding, engagement or any other means, to the round portion under consideration, on the other hand. In certain embodiments, such a round member may have at least one opening.

The invention also relates to an assembly composed of a filter cartridge such as defined above and a gasket having at least three lobes defining at least three fluid receiving areas.

According to an alternative, this gasket may be essentially h or l-shaped in cross-section, i.e. have three lobes.

According to another preferred alternative of the invention, this filter gasket will have at least four lobes. According a most preferred alternative, it will be essentially x-shaped in cross-section.

The invention, as well as its various advantages will be understood more readily due to the following description of two embodiments thereof, with reference to the drawings, where:

Figure 1:
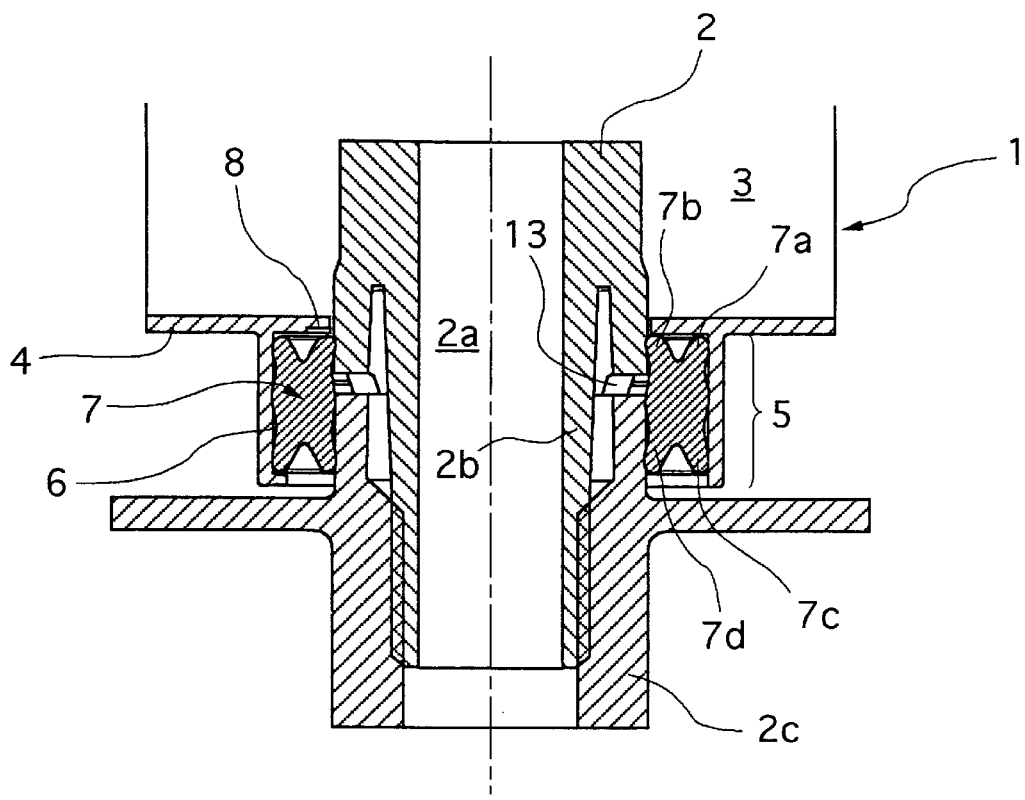
FIG. 1 shows a cross-sectional view of a first embodiment of a filter cartridge/gasket assembly installed on the two-piece center tube of a filter feed trough.

Referring to FIG. 1, it represents a section of a filter cartridge 1 installed on the center tube 2 of a filter composed of an upper part 2b and a shaft 2c. A drain opening 13 is defined between parts 2b and 2c. This cartridge, shown partially, incorporates a filter medium 3 and an end flange 4.

According to this invention, this end flange has a projecting part 5 defining a cavity 6 wherein a gasket 7 can be placed.

As part of the present embodiment, this gasket 7 is essentially x-shaped in cross-section and has 4 lobes 7a, 7b, 7c, 7d defining 3 areas, namely an upper area between lobes 7a and 7b, and a lower area between lobes 7d and 7c and a lateral area between lobes 7b and 7d.

In accordance with the present invention, flange 4 has a pressurizing duct 8 to be described in further detail with reference to FIG. 2.

Figure 2:
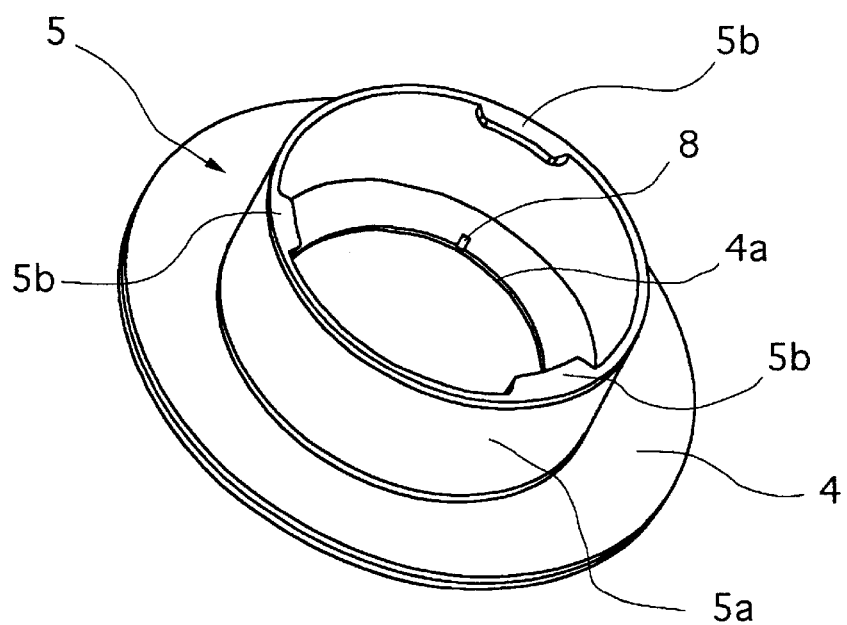
FIG. 2 shows a perspective view of the end flange of the filter cartridge shown in FIG. 1.

Referring to FIG. 2, the projecting part 5 of the end flange 4 is composed of a first portion 5a essentially parallel to the longitudinal axis of the filter cartridge and a second portion composed of a plurality of pins 5b perpendicular to the first portion. These pins 5b allow to retain a filter gasket positioned inside the cavity 6 that it defines as shown in FIG. 1.

With such an end flange architecture, a gasket can be prepositioned inside the flange. This architecture also has the advantage of being easy to cast as one piece.

As is also apparent in FIG. 2, the pressurizing duct is composed of 3 notches 8 equally distributed over the inside circumference 4a of flange 4.

When the filter is pressurized, the pressurized fluid passes through the medium 3 of filter cartridge 1 and enters the porthole 2a of the center tube due to openings (not shown). The fluid retrieved in this porthole is cleared of impurities. During this filter operation, a small part of pressurized fluid enters through the notches 8 into cavity 6 and more particularly into the upper area defined by lobes 7a, 7b of the gasket 7 being x-shaped in cross-section. The pressurized fluid also comes through the bottom of the filter into the lower area of the cavity 6 defined by lobes 7c and 7d. Such fluid introduction pressurizes the gasket and allows the lobes 7b and 7d thereof to be pressed against the center tube 2 and lobes 7a and 7c against the inner wall of the projecting part 5. This gasket distortion allows to ensure perfect sealing with the drain opening 13 opposite to the lateral area defined between lobes 7b and 7d and to avoid leakage between the three fluid receiving areas defined between lobes 7a, 7b (upper area), 7c, 7d (lower area) and 7b, 7d (lateral area).

In this embodiment, the projecting part 5 of end flange 4 is made integrally, i.e. portions 5a and 5b are cast as one piece with the end flange 4 itself.

Figure 3:
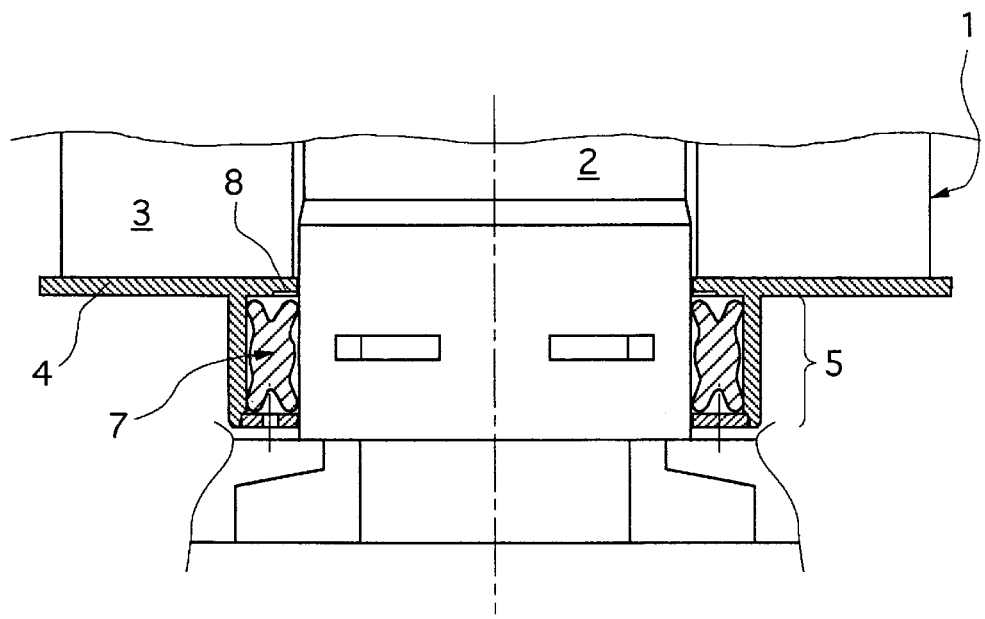
FIG. 3 shows a second embodiment of a filter cartridge/gasket assembly installed on the one-piece center tube of a filter feed trough.
Figure 4:
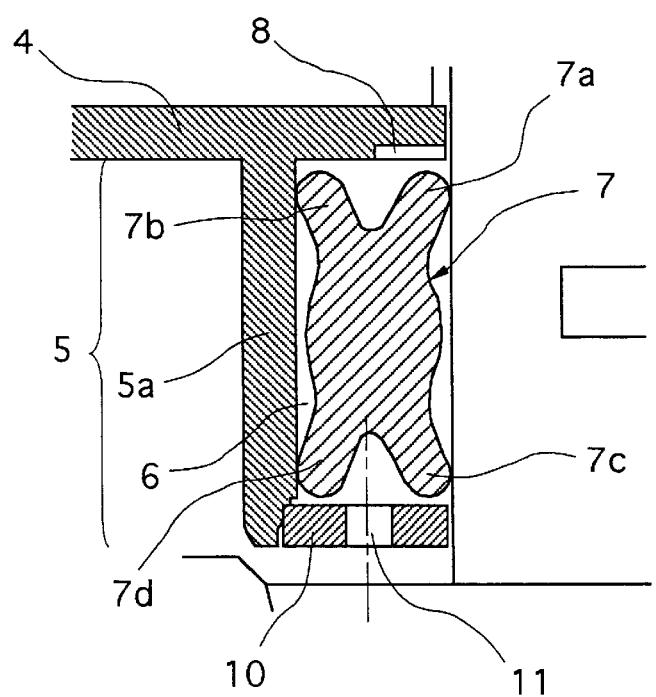
FIG. 4 shows an enlarged partial sectional view of the end flange and the gasket shown in FIG. 3.

In the embodiment shown in FIG. 3 and FIG. 4, the end flange 4 has a projecting portion 5 composed of two distinct members.

Referring to FIG. 4, this projecting part comprises a first portion 5a made integrally with the end flange 4 and an end member 10 applied by ultrasonic welding to this portion 5a and having a slit 11. The round member 10 allows to capture the gasket 7 with 4 lobes 7a, 7b, 7c, 7d inside cavity 6.

Figure 5:
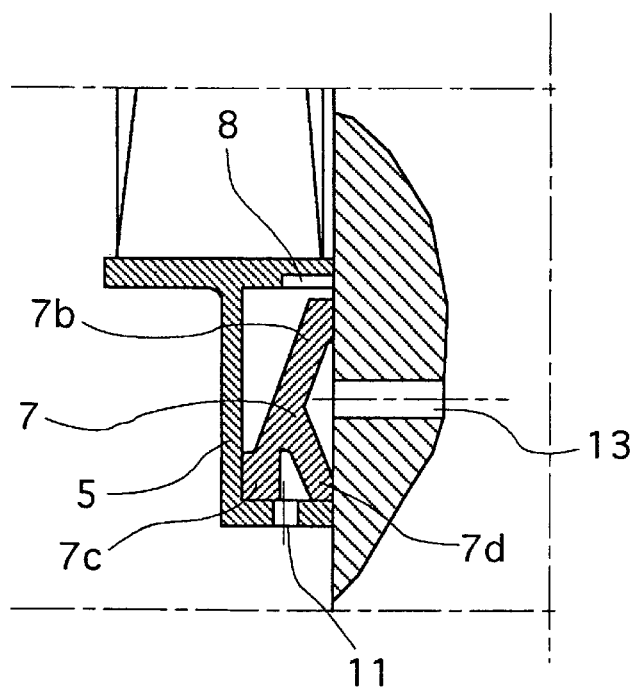
FIG. 5 shows a partial cross-sectional view of a third embodiment of the invention.
Figure 6:
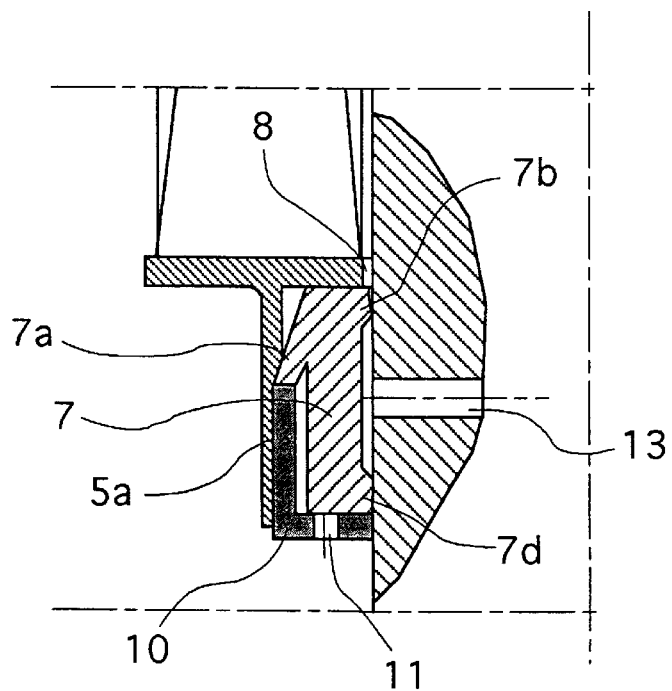
FIG. 6 shows a partial cross-sectional view of a fourth embodiment of the invention.

FIGS. 5 and 6 show two more embodiments of the invention.

Referring to FIG. 5, the gasket 7 used is h-shaped in cross-section defining three lobes 7b, 7c, 7d. In this embodiment, the projecting part 5 is integral and has a lower fluid passage slit 11.

Referring to FIG. 6, the gasket 7 used is l-shaped in cross-section also defining three lobes 7a, 7b, 7d. In this embodiment, the projecting part 5 is composed of a round portion 5a whereon a round member 10 is welded that has a lower fluid passage slit 11. (In other embodiments, this round member could also be clipped or joined by any other means to said round portion).

It will be noted that in these figures, the gaskets are shown without pressure being applied by fluid.

The embodiments of the invention described here are not meant to reduce the scope thereof. Consequently, numerous modifications can be made thereto without departing from its scope.

What is claimed is:

1. A filter cartridge (1) to be inserted in the filter feed trough of a filter for fluid flowing an apparatus and for cooperating with a center tube (2) of said filter, said cartridge having a filter medium (3) and at least one end flange (4) joined to said filter medium, said end flange having a central aperature about a longitudinal axis of said cartridge and being received over said center tube, said flange having (4) a generally annular projecting part (5) defining a cavity for lodging a gasket (7), characterized in that said flange has a plurality of pressurizing notches (8) extending from the central aperature of said flange to said cavity.

2. A filter cartridge according to claim 1, characterized in that said notches (8) constituting pressurizing channels are advantageously distributed equally around the circumference of the central of said end flange.

3. A filter cartridge according to claim 2, characterized in that said projecting part (5) comprises a first annular portion (5a) essentially parallel to the longitudinal axis of said cartridge extended by at least one second portion essentially perpendicular to said first portion (5a).

4. A filter cartridge according to claim 3, characterized in that said second portion comprises a plurality of pins (5b) extending radially inward toward said central aperature, said pins being distributed around the circumference of said first round portion (5a).

5. A filter cartridge according to claim 1 characterized in that said projecting part (5) comprises an annular portion (5a) essentially parallel to the longitudinal axis of said cartridge and an end flange member (10) joined to said round portion and spaced axially from said flange (4).

6. A filter cartridge according to claim 5, characterized in that said round end flange (10) has at least one central opening (11).

7. A filter cartridge according to claim 1 further comprising a gasket received in said cavity of said filter cartridge, characterized in that said gasket is an annular gasket (7) having a cross-sectional configuration with at least three lobes defining at least three fluid receiving areas.

8. A filter cartridge, according to claim 7, characterized in that said gasket is generally one of h or l-shaped in cross-section.

9. A filter cartridge according to claim 7, characterized in that said gasket (7) has at least four lobes (7a, 7b, 7c, 7d).

10. A filter cartridge according to claim 9, characterized in that said gasket (7) is generally x-shaped in cross-section.

* * * * *